(12) United States Patent
Seung

(10) Patent No.: US 8,201,265 B2
(45) Date of Patent: Jun. 12, 2012

(54) METHOD FOR GENERATING READ ERROR DURING STANDARD DVD DISC MANUFACTURING

(75) Inventor: Heung-Chan Seung, Seoul (KR)

(73) Assignee: SETTEC, Inc., Seoul (KR)

( * ) Notice: Subject to any disclaimer, the term of this patent is extended or adjusted under 35 U.S.C. 154(b) by 1226 days.

(21) Appl. No.: 11/711,885

(22) Filed: Feb. 28, 2007

(65) Prior Publication Data
US 2008/0127357 A1 May 29, 2008

(30) Foreign Application Priority Data
Nov. 28, 2006 (KR) .......................... 10-2006-0118412

(51) Int. Cl.
*G06F 7/00* (2006.01)
(52) U.S. Cl. ............ 726/32; 726/33; 714/701; 714/758; 386/126
(58) Field of Classification Search .................... 726/33, 726/32; 714/701, 758; 386/126
See application file for complete search history.

(56) References Cited

U.S. PATENT DOCUMENTS

| | | | | |
|---|---|---|---|---|
| 5,920,353 A | | 7/1999 | Diaz et al. ..................... 348/402 |
| 5,987,630 A | * | 11/1999 | Yamawaki ..................... 714/701 |
| 6,466,736 B1 | * | 10/2002 | Chen et al. ..................... 386/126 |
| 6,715,123 B2 | * | 3/2004 | Kitamura et al. ............. 714/769 |
| 6,983,413 B2 | * | 1/2006 | Otake et al. ..................... 714/764 |
| 7,327,818 B2 | * | 2/2008 | Kojima et al. ................. 375/368 |
| 2003/0161239 A1 | * | 8/2003 | Yamawaki ................. 369/59.25 |
| 2004/0015769 A1 | * | 1/2004 | Nagai et al. ..................... 714/758 |
| 2005/0216816 A1 | * | 9/2005 | Kojima et al. ................. 714/758 |
| 2005/0289338 A1 | * | 12/2005 | Stadlman ...................... 713/153 |

OTHER PUBLICATIONS

Koltringer et al., Implications for Designing the User Experience of DVD Menus, Apr. 2005, ACM, 1-59593-002-7/05/0004.*

* cited by examiner

*Primary Examiner* — Vivek Srivastava
*Assistant Examiner* — Samuel Ambaye
(74) *Attorney, Agent, or Firm* — Sherr & Vaughn, PLLC

(57) ABSTRACT

A method is disclosed for generating a read error during standard DVD disc manufacturing. The method generates a read error in an error correction code (ECC) block including a specific error generation data pattern, when main data of 2,048 bytes is generated using the specific error generation data pattern according to a DVD standard. The error-pattern original data is inserted into the main data that is scrambling based on a DVD standard. The scrambled data is recorded in data sectors. The scrambled data including an error pattern which causes a read error is consecutively recorded in the data sectors included in the ECC blocks, in a process in which the data sectors are grouped based on 16 units to form the ECC blocks.

7 Claims, 7 Drawing Sheets

FIG.4

| List Of Byte Values Causing Error(Total 42) ||
|---|---|
| Serial Number | Byte Value (Hexadecimal Number) |
| 1 | 0x85 |
| 2 | 0x8E |
| 3 | 0x95 |
| 4 | 0x9E |
| 5 | 0xA4 |
| 6 | 0xA6 |
| 7 | 0xA8 |
| 8 | 0xA9 |
| 9 | 0xAB |
| 10 | 0xAD |
| 11 | 0xAE |
| 12 | 0xAF |
| 13 | 0xB3 |
| 14 | 0xB4 |
| 15 | 0xB5 |
| 16 | 0xB8 |
| 17 | 0xBA |
| 18 | 0xBC |
| 19 | 0xBE |
| 20 | 0xC0 |
| 21 | 0xC2 |
| 22 | 0xC4 |
| 23 | 0xC7 |
| 24 | 0xC8 |
| 25 | 0xCB |
| 26 | 0xCD |
| 27 | 0xD3 |
| 28 | 0xD5 |
| 29 | 0xD9 |
| 30 | 0xDF |
| 31 | 0xE2 |
| 32 | 0xE5 |
| 33 | 0xE7 |
| 34 | 0xED |
| 35 | 0xEE |
| 36 | 0xF0 |
| 37 | 0xF2 |
| 38 | 0xF4 |
| 39 | 0xF6 |
| 40 | 0xF8 |
| 41 | 0xFA |
| 42 | 0xFC |

METHOD FOR GENERATING READ ERROR DURING STANDARD DVD DISC MANUFACTURING

BACKGROUND OF THE INVENTION

1. Field of the Invention

The present invention relates to technology of a digital versatile disc (DVD), and more particularly, to a method that can generate a read error in an error correction code (ECC) block including a specific error generation data pattern, in a process in which a standard DVD disc is manufactured, when main data of 2,048 bytes is generated using the specific error generation data pattern according to a DVD standard.

2. Description of the Related Art

Generally, various discs, such as optical discs, are used to store information of various formats. Recently, with the commercial spread of recordable optical discs, such as CD-R, CD-RW, DVD-R, DVD-RW, and DVD-RAM, etc., optical discs are more and more often used as private auxiliary memory means. Furthermore, with the development of optical disc-related technology, large-capacity DVD discs are also widely used.

In addition, optical disc apparatus used as a dedicated optical disc player have generally functioned to spread large-capacity contents. Recently, with the spread of recordable optical disc-related apparatuses, the apparatuses are also increasingly used as private auxiliary storing devices. However, as the recordable optical disc apparatuses are widely used privately, such wide-use has led to the problem that they may be used as an illegal copy tool.

Also, since such copy using the recordable optical disc apparatuses is performed digitally, signals from a copied disc may not be deteriorated or altered, compared to signals from the original disc. Therefore, contents or files from the copied disc may have almost the same quality as the original disc, which causes serious harm to the content developers or the original disc manufacturers.

Furthermore, as various hardware or software has been rapidly developed to implement copying, illegal copying and distributing of an original disc has led to serious economic and social problems. Therefore, a copy technique to originally prevent such illegal copying is needed.

To prevent such illegal copying, a standard DVD disc adopting an illegal copying prevention technique is manufactured by the following two methods: one is that an element which can cause a read error is inserted into DVD discs during mass production; and another is that an element which can cause a read error is inserted into DVD discs using a general optical disc drive (ODD).

Here, the mass production of the DVD discs is performed in the following way: a file is read from an original master disc or tape and stored in an encoding system; after that, the file read from the encoding system is processed through a procedure shown in FIG. 1 and used to manufacture a stamper; and the stamper is used to perform mass production of DVD discs. While the original master disc is manufactured, error data may be generated by a method for generating a read error in a process of manufacturing DVD discs.

Presently, the general ODD has been classified into a drive for CD series and a drive for DVD series. Of them, CD writers that record data to CDs support various recording modes, such as Track-At-Once (TAO), Session-At-Once (SAO), Disc-At-Once (DAO), etc.

A CD writer supporting DAO may implement an "unreadable sector" that causes a read error. Unlike the CD writer, a standard DVD writer can record only user data of 2,048 bytes on a DVD disc in a TAO mode. Therefore, the standard DVD writer cannot implement an intended "unreadable sector" except for a physical defect of a recording-finished disc.

Therefore, more research should be done to enable an error to generate when DVD discs recording data by a standard DVD writer is read or when the mass-produced DVD discs are read. More specifically, methods that can process main data of 2,048 bytes to generate a read error must be researched.

SUMMARY OF THE INVENTION

Therefore, the present invention has been made in view of the above problems, and it is an object of the present invention to provide a method for generating a read error during standard DVD disc manufacturing, which can generate a read error in an error correction code (ECC) block including a specific error generation data pattern, when main data of 2,048 bytes is generated using the specific error generation data pattern according to a DVD standard.

In accordance with the present invention, the above object can be accomplished by the provision of a method for generating a read error during standard DVD disc manufacturing, in which an error-pattern original data is inserted into main data that is scrambling based on a DVD standard, such that the scrambled data can be recorded in data sectors, and the scrambled data including an error pattern which causes a read error can be consecutively recorded in the data sectors included in error correction code (ECC) blocks, in a process in which the data sectors are grouped based on 16 units to form the ECC blocks.

Preferably, the error pattern is formed in such a way to consecutively record the same byte value in the data sector, in which the data sector includes at least one error pattern.

Preferably, the byte value is one of 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF2, 0xF4, 0xF6, 0xF8, 0xFA, and 0xFC.

Preferably, the data sector recording the error pattern is consecutively formed by 2~16 in the ECC blocks.

BRIEF DESCRIPTION OF THE DRAWINGS

The above object, other features and advantages of the present invention will be more clearly understood from the following detailed description taken in conjunction with the accompanying drawings, in which:

FIG. 4 shows a list of error patterns recorded in a data sector, according to the present invention;

DESCRIPTION OF THE PREFERRED EMBODIMENTS

Preferred embodiments, according to a read error generation method of the present invention, will be described in detail with reference to the accompanying drawings.

Figure 1:
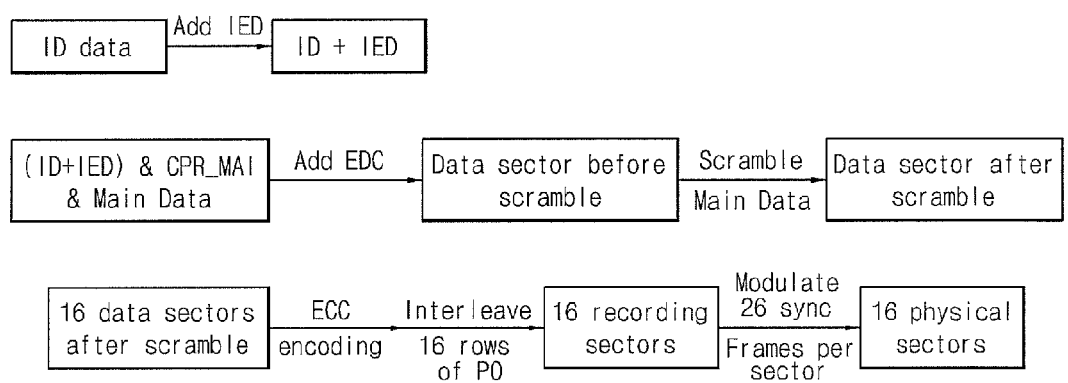
FIG. 1 is a view illustrating a process where a sector is generated when a DVD disc is manufactured based on a DVD standard.

FIG. 1 is a view illustrating a process where a sector is generated when a DVD disc is manufactured based on a DVD standard, which will be briefly described below.

Firstly, a "sector" is variously called "data sector," "recording sector," and "physical sector" according to the data processing steps.

Figure 3:
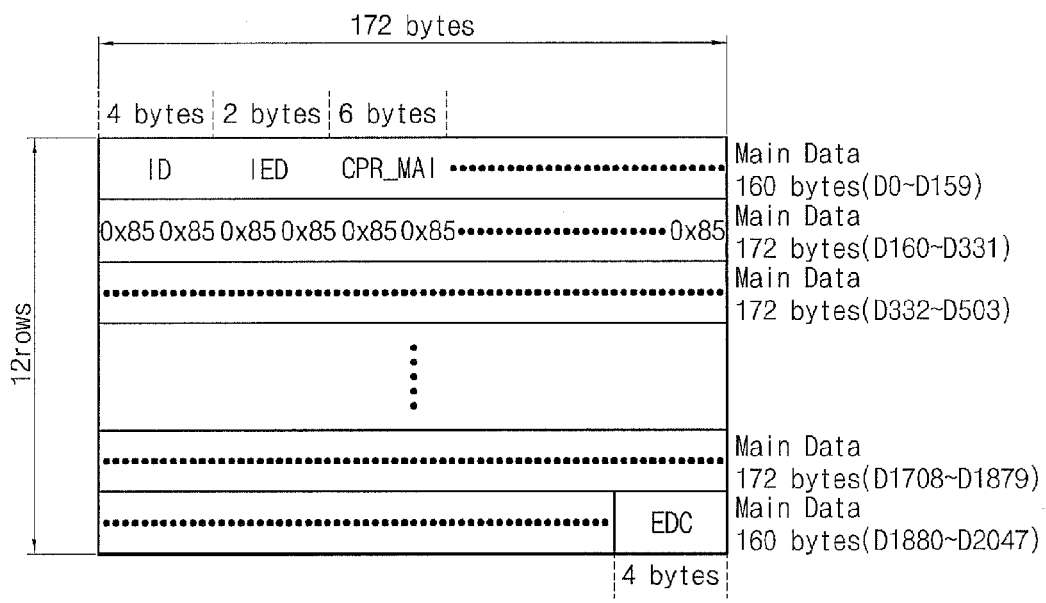
FIG. 3 is a view illustrating an error pattern recorded in a data sector, according to the present invention.
Figure 5:
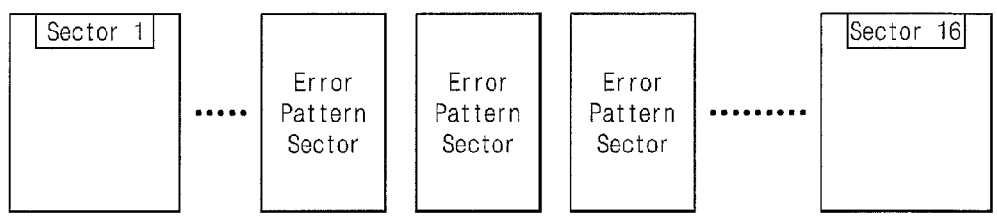
FIG. 5 is a view illustrating the error correction code (ECC) block causing a read error, according to the present invention.

The "data sector," as shown in FIG. 1 or 3, includes main data of 2,048 bytes, identification data (ID) of 4 bytes, identification data error detection code (IED) of 2 bytes, copyright management information (CPR_MAI) of 6 bytes, and error detection code (EDC) of 4 bytes.

The data sector is generated, as shown in FIG. 1, in such a way that: the IED data affixes to the ID data to generate ID+IED; the CPR_MAI affixes to the ID+IED to generate (ID+IED)+CPR_MAI; and then the main data and EDC affix to the (ID+IED)+CPR_MAI, in order.

After the EDC of the main data is calculated, the main data is scrambled and then the scrambled main data is recorded in the data sector. After that, a Reed-Solomon error correction code is formed based on a grouping of 16 data sectors. The result is called an error correction code (ECC) block.

The "recording sector" means data, generated as Innercode Parity (PI) and Outer-code Parity (PO), are added to the sector data completing the ECC-encoding. The PO and PI are generated based on the ECC block unit.

The "physical sector" means a result generated as a SYNC code is inserted to portions prior to every 91 bytes of the recording sector to perform 8/16 modulation.

The 8/16 modulation refers to a process where input data of 8 bits is modulated to data of 16 channel bits. The converted 16 channel bits have a run length limitation of 2~10. The run length refers to the number of consecutive 0s before a 1 bit is recorded. The run length limitation of 2~10 indicates that the number of consecutive 0s in the channel bits is between the minimum run length of 2 and the maximum run length of 10.

To this end, the DVD specification includes a specific modulation table (refer to Tables 3.3-1, 3.3-2, Part 1, DVD Spec. book). The purpose of the 8/16 modulation is to enhance a servo characteristic as the number of '0' and '1' to be recorded in a disc is limited by the run length.

When the data sector is generated through the foregoing processes, the main data is scrambled based on the DVD standard specification and then recorded in the data sector. The scrambled data is descrambled in a process of reading and then restored to the main data. Namely, normally scrambled data can be restored in a process of reading without a read error.

The present invention enables a read error to be generated when the scrambled data is descrambled. To this end, the scrambled data, causing a read error in a process of descrambling, needs to be recorded in the data sector.

More specifically, error-pattern original data is inserted into main data that is scrambling based on a DVD standard and input, such that the scrambled data can be recorded in data sectors, and the scrambled data including a certain error pattern, which causes a read error in a process of descrambling the scrambled data, can be consecutively recorded in the data sectors, in a process in which the data sectors are grouped based on 16 units to form the ECC blocks.

Figure 2:
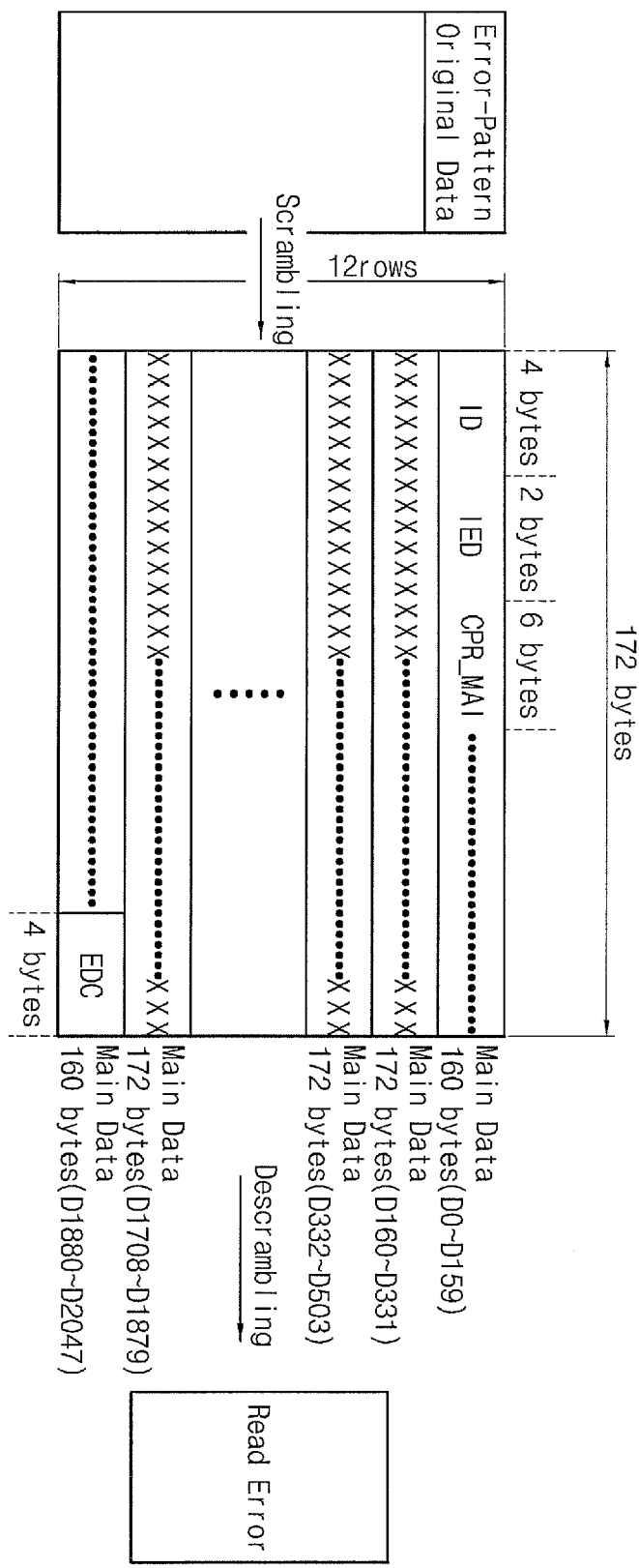
FIG. 2 is a view describing a relation between the error-pattern original data and the scrambled data causing a read error, according to the present invention.

After that, as shown in FIG. 2, when the error-pattern original data inserted into the main data is scrambled, a data sector is generated, including an error pattern where a specific byte value is consecutively recorded. The data including such an error pattern causes a read error in a process of descrambling.

Here, the error pattern is configured in such a way that a specific byte value is consecutively recorded in the data sector. Namely, the error pattern is a pattern where the same byte value is consecutively recorded within a single data sector.

For example, as shown in FIG. 3, when a data sector includes a pattern where the byte value of 0x85 is consecutively recorded in 172 bytes, which is called an error pattern, a read error occurs in a process of reading a DVD disc including the data sector. Here, it has been already empirically proven that kinds of byte values form an error pattern and cause a read error in the process of reading a DVD disc.

On the other hand, although the foregoing embodiment describes that the error pattern formed by consecutive recording of the same byte value is only singly generated in the data sector, there may be another error pattern where different byte values are consecutively recorded in the data sector. Namely, the data sector has at least one or more error patterns each of which different byte values are consecutively recorded therein.

FIG. 4 shows a list of the byte values forming error patterns causing a read error, which have been empirically proven. Specifically, the byte values are 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF4, 0xF6, 0xF8, 0xFA, and 0xFC. The error patterns are formed as one of the bytes is consecutively recorded in the data sector.

When at least one of the byte values on the list is consecutively recorded in the data sector, it causes a read error when a DVD disc is read. When the error pattern is determined, the error-pattern original data can be automatically determined based on the DVD standard specification.

There must be data sectors, in which scrambled data including the error pattern is recorded, in every ECC blocks. That is, the scrambled data including the error pattern must be consecutively recorded in the data sectors included in the ECC blocks, such that a read error can be generated in a process of descrambling.

More specifically, when the data sectors including such an error pattern are consecutively formed by 2~16 in the ECC blocks, the entire ECC blocks causes a read error.

When an error pattern is recorded in a DVD disc through the foregoing method, a read error occurs in a process of reading the DVD disc, which is described through a test result as follows, referring to FIGS. 6A and 6B.

Figure 6A:
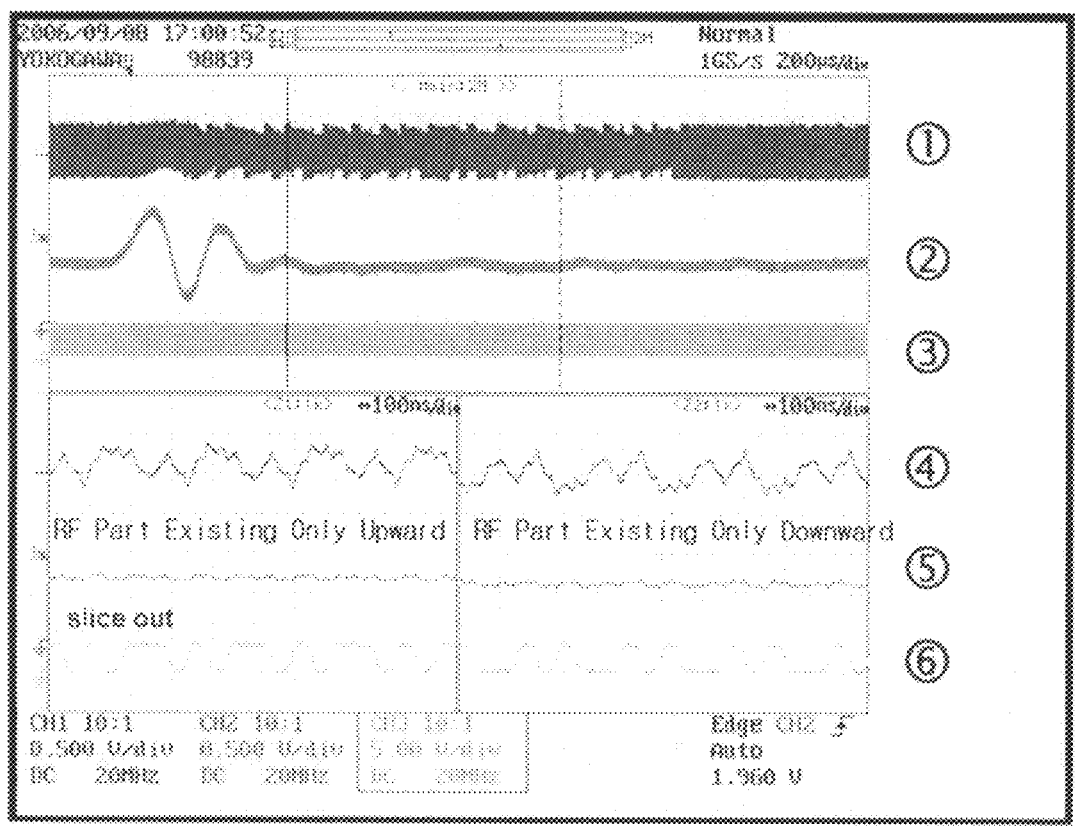
FIGS. 6A and 6B are photographs taken of a test result of reading, using the CD Speed TOOOL.

FIG. 6A shows a signal pattern when data is read from a disc in which the foregoing error pattern is recorded. Waveform ① is an eye pattern (RF pattern) in a sinusoidal form when a laser diode reads data in the disc. Waveform ② is a tracking servo signal as a control signal that allows a data-reading operation to be performed along the track of the disc. Waveform ③ is an eye pattern (RF pattern) that is sliced at a certain level to digitize the eye pattern (RF pattern), since the eye pattern has a lot of noise and is distorted. Waveforms ④, ⑤, and ⑥ are views enlarging waveforms ①, ②, and ③, respectively.

As shown in FIG. 6A, the waveforms ④ and ⑥ each show that the same pattern is repeated. This same repeated pattern indicates that an error has occurred.

Figure 6B:
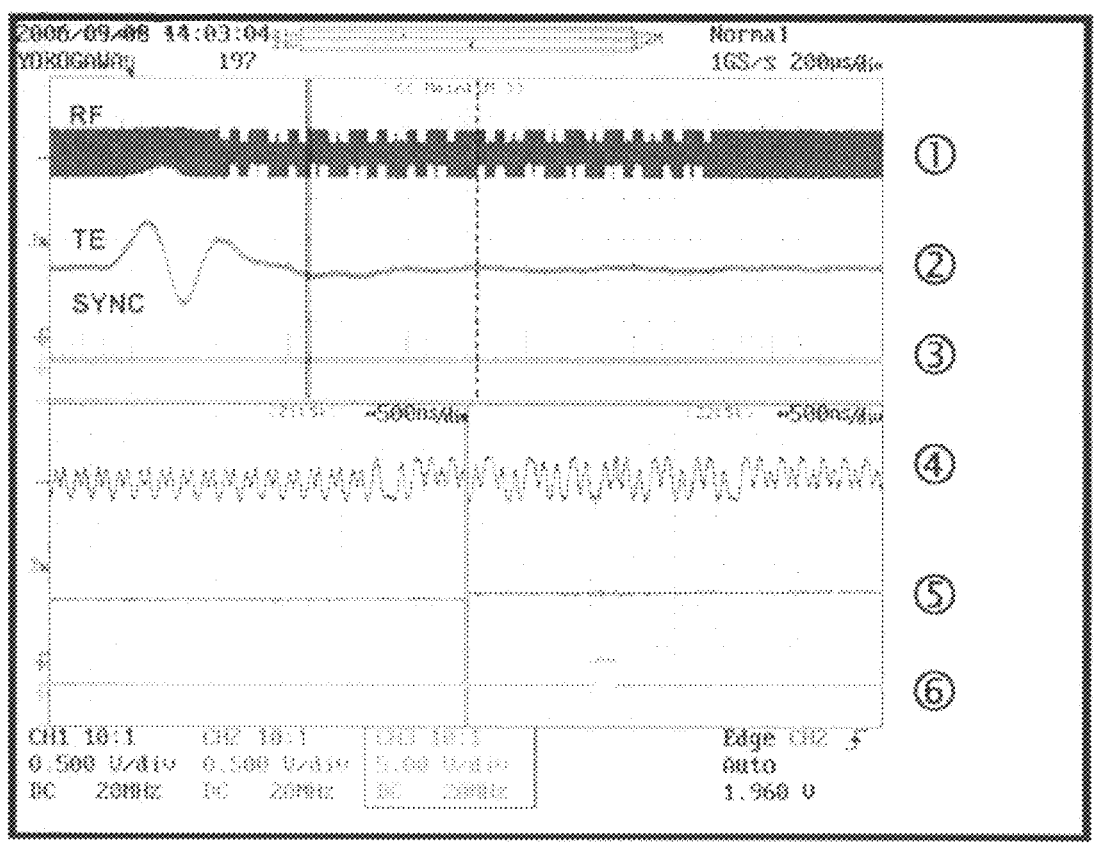

In FIG. 6B, waveforms ①, ②, and ③ show an eye pattern (RF pattern), a tracking servo signal, and a sector sync pattern, respectively. Waveforms ④, ⑤, and ⑥ are views enlarging the waveforms ①, ②, and ③, respectively.

In the waveforms of FIG. 6B, a "SYNC" is sparsely shown in the middle portion of sector sync pattern of waveform ③; a tracking servo signal of waveform ② has an offset; and the eye pattern (RF pattern) includes the same pattern. Therefore, the waveforms show that the sector sync cannot be searched for and thus an error occurs that a corresponding sector cannot be read.

According to the read error generation method of the present invention, main data of 2,048 bytes can be generated by using a specific error generation data pattern based on a DVD standard, and thus a read error can be caused in the ECC block with a specific error generation data pattern.

Also, the present invention can generate an intended "unreadable sector" using main data of 2,048 bytes with a specific data pattern, without using a physical defect of a disc.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A DVD disc having data sectors according to DVD standard, the DVD disc comprising:
   a first data sector recorded in an error correction code (ECC) block, the first data sector having a first error pattern configured in such a way that one of 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF4, 0xF6, 0xF8, 0xFA, and 0xFC is repeated in a main data field of the first data sector; and
   a second data sector recorded in the error correction code (ECC) block, the second data sector having a second error pattern configured in such a way that one of 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF4, 0xF6, 0xF8, 0xFA, and 0xFC is repeated in a main data field of the second data sector,
   wherein the first and second error patterns cause reading error during a descrambling process of the main data field of the first data sector and the main data field of the second data sector,
   wherein, the first data sector and the second data sector are consecutively recorded in the error correction code (ECC) block.

2. The DVD disc of claim 1, wherein the main data field of the first data sector is filled with the first error pattern.

3. The DVD disc of claim 1, wherein the main data field of the first data sector and the main data field of the second data sector are recorded by a Track-At-Once (TAO) recording mode.

4. A method of manufacturing DVD disc which has data structure according to DVD standard, the method comprising:
   generating an identification data for identifying a data sector;
   adding a main data to the identification data, wherein the main data has an error pattern configured in such a way that one of 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF4, 0xF6, 0xF8, 0xFA, and 0xFC is repeated, wherein said error pattern causes reading error during a descrambling process of the main data;
   scrambling the main data; and
   generating an error correction code (ECC) block using at least two scrambled main data, wherein said at least two scrambled main data are consecutively formed with each other in the ECC block.

5. The DVD disc of claim 1, wherein the main data field of the second data sector is filled with the second error pattern.

6. A DVD disc having data sectors according to DVD standard, the DVD disc comprising:
   a first data sector in an error correction code (ECC) block, the first data sector having a first error pattern which causes reading error during a descrambling process of a main data field of the first data sector, wherein the first error pattern includes a first byte value having one byte length, wherein the first byte value is chosen from an error pattern list and consecutively repeated in the main data field of the first data sector; and
   a second data sector in the error correction code (ECC) block, the second data sector having a second error pattern which causes reading error during a descrambling process of a main data field of the second data sector, wherein the second error pattern includes a second byte value having one byte length, wherein the second byte value is chosen from the error pattern list and consecutively repeated in the main data field of the second data sector,
   wherein the error pattern list is 0x85, 0x8E, 0x95, 0x9E, 0xA4, 0xA6, 0xA8, 0xA9, 0xAB, 0xAD, 0xAE, 0xAF, 0xB3, 0xB4, 0xB5, 0xB8, 0xBA, 0xBC, 0xBE, 0xC0, 0xC2, 0xC4, 0xC7, 0xC8, 0xCB, 0xCD, 0xD3, 0xD5, 0xD9, 0xDF, 0xE2, 0xE5, 0xE7, 0xED, 0xEE, 0xF0, 0xF2, 0xF4, 0xF6, 0xF8, 0xFA, and 0xFC.

7. The DVD disc of claim 6, wherein, the first data sector and the second data sector are consecutively recorded in the error correction code (ECC) block.

* * * * *